United States Patent [19]

Flowers, Jr.

[11] Patent Number: 5,180,263
[45] Date of Patent: Jan. 19, 1993

[54] CARGO TIEDOWN ANCHOR

[76] Inventor: F. W. Flowers, Jr., 8207 Waterview Way, Winter Haven, Fla. 33884

[21] Appl. No.: 843,217

[22] Filed: Feb. 28, 1992

[51] Int. Cl.⁵ .............................................. B61D 45/00
[52] U.S. Cl. ..................................... 410/106; 410/101
[58] Field of Search ............... 410/101, 102, 104, 105, 410/106, 107, 108, 109, 111, 112, 113, 114, 116

[56] References Cited

U.S. PATENT DOCUMENTS

| | | | |
|---|---|---|---|
| 2,953,104 | 9/1960 | Oakley | 410/109 |
| 3,779,502 | 12/1973 | Marberg | 410/116 |
| 3,831,532 | 8/1974 | Smith et al. | 410/113 X |
| 4,248,558 | 2/1981 | Lechner | 410/104 |
| 4,592,585 | 6/1986 | Oren et al. | 410/109 X |
| 4,699,410 | 10/1987 | Seidel | 410/101 X |
| 4,907,921 | 3/1990 | Akright | 410/111 |

FOREIGN PATENT DOCUMENTS

| | | | |
|---|---|---|---|
| 602270 | 7/1960 | Canada | 410/116 |
| 953578 | 12/1956 | Fed. Rep. of Germany | 410/101 |
| 2070523 | 9/1981 | United Kingdom | 410/116 |

Primary Examiner—Michael S. Huppert
Assistant Examiner—William M. Hienz
Attorney, Agent, or Firm—Edmund M. Jaskiewicz

[57] ABSTRACT

A cargo tiedown anchor for mounting on a vehicle or wall comprises a raised central circular portion on the front surface of a back plate and is rotatably positionable in an opening in a wall of a structural member on a vehicle. A U-shaped clip has a pair of legs and a tiedown ring is loosely retained between the legs of the clip. The legs are inserted in slots in the raised central circular portion of the back plate such that the ends of the legs protrude beyond the rear surface of the back plate. The clip is attached to the back plate behind the wall with the opening by welding around the outlines of the protruding leg ends.

15 Claims, 3 Drawing Sheets

CARGO TIEDOWN ANCHOR

The present invention relates to a tiedown anchor in which a U-shaped clip which retains a tiedown ring is attached to a wall surface for securing cargo lines on vehicles, more particularly, to the structure for securing the U-clip to the surface of a vehicle.

In the shipment of cargo, particularly by motor vehicle, it has been the practice to secure the cargo in position by means of straps or cargo lines which are attached to anchors which have been fixed upon walls, truck sides, the side beams of trailers and similar places. The anchor generally comprises a tiedown ring which is attached by a clip to a wall of the vehicle such that the ring has at least limited pivotable movement around the attaching member. One particular structure involves a U-shaped clip which retains a tiedown ring and the ends or legs of the clip are then welded directly to the side walls of the vehicle body or frame. The strength of such a tiedown anchor is entirely dependent on the weld of the clip to the wall surface. Further, the tiedown ring which is a component of this anchor is pivotable in a fixed vertical plane. Since in many instances the cargo lines secured to the anchor are positioned not in a vertical plane but at an angle to the vertical it is readily apparent that a side or twisting force is exerted against the tiedown anchor when the line has been secured in position. This additional side tension applied to the tiedown ring and clip detracts from the safety and operating life of the tiedown anchor.

It is therefore the object of the present invention to provide a novel and improved cargo tiedown anchor for vehicles.

It is an additional object of the present invention to provide a novel and improved structure for pivotably mounting a cargo tiedown ring on vehicles.

It is a further object of the present invention to provide a cargo tiedown anchor having a U-clip which retains a tiedown ring and the U-clip is attached behind the wall on which it is mounted.

It is still another object of the present invention to provide a cargo tiedown anchor having a significantly stronger welded connection between the legs of a clip retaining a tiedown ring and a base which is mounted in a wall.

According to one aspect of the present invention, a cargo tiedown anchor comprises a central circular raised portion on the front face of a back plate and the raised portion is rotatably positioned in an opening in a wall. There is a pair of slots in the raised portion through which the legs of a U-shaped clip which retains a tiedown ring are inserted. The ends of the legs of the clip protrude beyond the rear surface of the back plate a predetermined distance and these protruding ends of the legs are welded to the rear surface of the back plate. The result is a tiedown anchor wherein the clip which retains the tiedown ring is attached behind the wall in which it is mounted and the anchor is free to pivot 360 degrees so as to align itself with cargo lines attached to the anchor.

Other objects and advantages of the present invention will be apparent upon reference to the accompanying description when taken in conjunction with the following drawings, which are exemplary, wherein.

Proceeding next to the drawings wherein like reference symbols indicate the same parts throughout the various views, a specific embodiment and modifications of the present invention will be described in detail.

Figure 1:
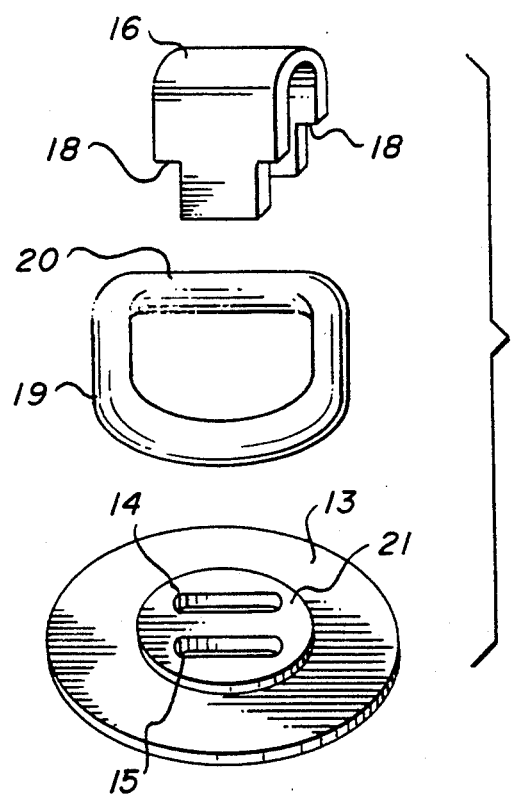
FIG. 1 is a perspective view of the components of the cargo tiedown anchor according to the present invention before assembly.
Figure 2:
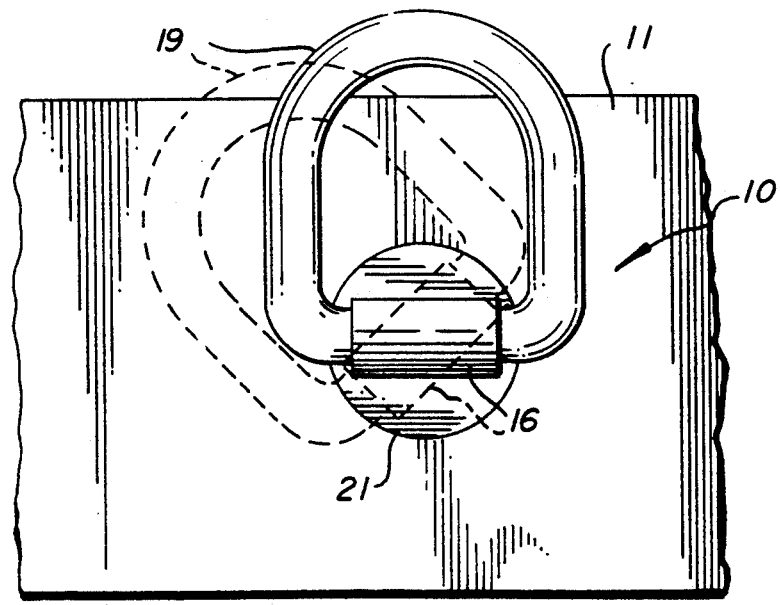
FIG. 2 is a front elevational view of the tiedown anchor of the present invention mounted in a side rail member of a trailer vehicle.

A cargo tiedown anchor according to the present invention is indicated generally at 10 in FIG. 2 and is mounted in an opening in a structural member 11. The several components of the tiedown anchor are illustrated in FIG. 1 and will be presently described in detail.

The structural member 11 is a typical 8 inch structural channel which is a common side rail member for a trailer. However, the structural member 11 may be any size channel, beam or other structural component.

Figure 6:
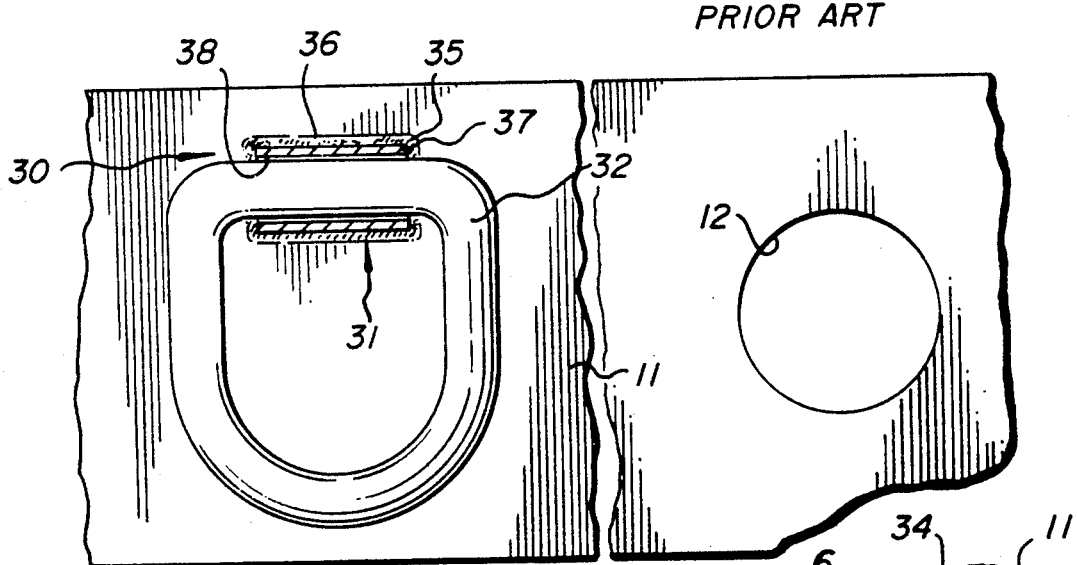
FIG. 6 is a front elevational view of a tiedown anchor according to the prior art showing only a portion of the tie-down ring and portions of the clip being cut away to show the weld seam.

The structural members 11 when used as the side rails of a trailer are commonly provided with circular openings having a diameter of 3⅛ inches for the purpose of accommodating lights and is shown at 12 in FIG. 6. The tiedown anchor 10 comprises a circular back plate 13 illustrated in FIG. 1 and this back plate comprises a raised center portion 14 in which is cut a pair of parallel slots 15. The back plate may be machined from ½ inch steel plate with the outer portion being removed so that a central portion 14 remains.

A U-shaped clip 16 has a pair of parallel legs 17 and each leg is notched along the edges thereof to define the transverse shoulders 18.

A tiedown ring 19 has a substantially straight portion 20 which is movably or pivotably received within the clip 16.

Figure 3:
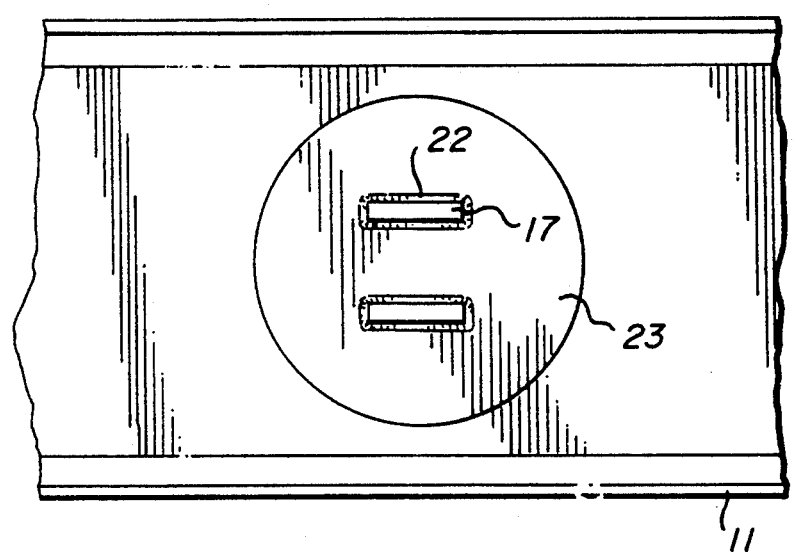
FIG. 3 is a rear elevational view of the tiedown anchor shown in FIG. 2.
Figure 7:
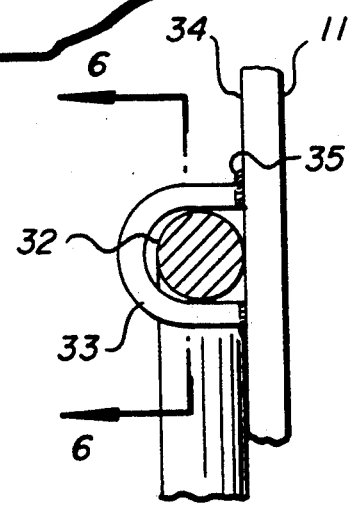
FIG. 7 is a side elevational view of the prior art anchor of FIG. 6 showing the manner in which the ends of the clip are welded to a face of a structural member.

The back plate 13 is inserted into the opening 12 from the rear of the structural member so that the raised central portion or boss is positioned within the opening 12. Upon insertion of the back plate into the opening, the clip 16 is positioned over the straight portion 20 of the tiedown ring 19 and the legs 17 are then inserted into the slots 15. The clip 16 is inserted into the slots until the shoulders 18 abut on the front or outer face 21 of the central portion. The ends of the legs 17 are then welded to rear face 23 of the back plate as shown in FIG. 3. It is preferable that the welds 22 are placed completely around the outline of the end of the leg protruding through the back plate and beyond the rear surface 23 of the back plate. The protrusion of the legs beyond the rear face of the base plate enables a weld 22 to be made completely around the outline of a section of the leg 17 which represents a significant increase in strength of the clip over the prior art tiedown anchor as seen in FIGS. 6 and 7.

A prior art tiedown anchor is indicated generally in FIG. 6 at 30 and comprises a U-shaped clip 31 and a tiedown ring 32 retained between the legs of 33 of the clip. However, in the prior art, the ends of the legs 33 abut front surface 34 of the structural member 11 and are welded to this front surface. Because of the presence of the tiedown ring 32 between the legs 33 of the U-shaped clip, a weld 35 can be made only along the longer dimension 36 of the legs, on the sides of the legs 37 and occasionally, only a very short distance 38 on the inner side of the leg 33 as shown in FIG. 6. As a result, the welds retaining such a prior art clip in position are susceptible to tearing at their edges when loads are applied against the clip from an angle, and this angle essentially constitutes 360 degrees around the clip as seen in FIG. 6.

Thus, the tiedown anchor according to the present invention not only has significantly more welding attaching the legs of the clip to the back plate but the legs of the back plate are also inserted within the slots and thus the clip will not break out or become loose unless the clip actually comes out of the slots 15. Thus, not only does the tiedown anchor according to the present invention have a significantly greater strength and resistance to angular forces because of increased welding strength but at the same time the legs of the clip are mounted within slots and not merely abutted to the surface of a structure.

Figure 5:
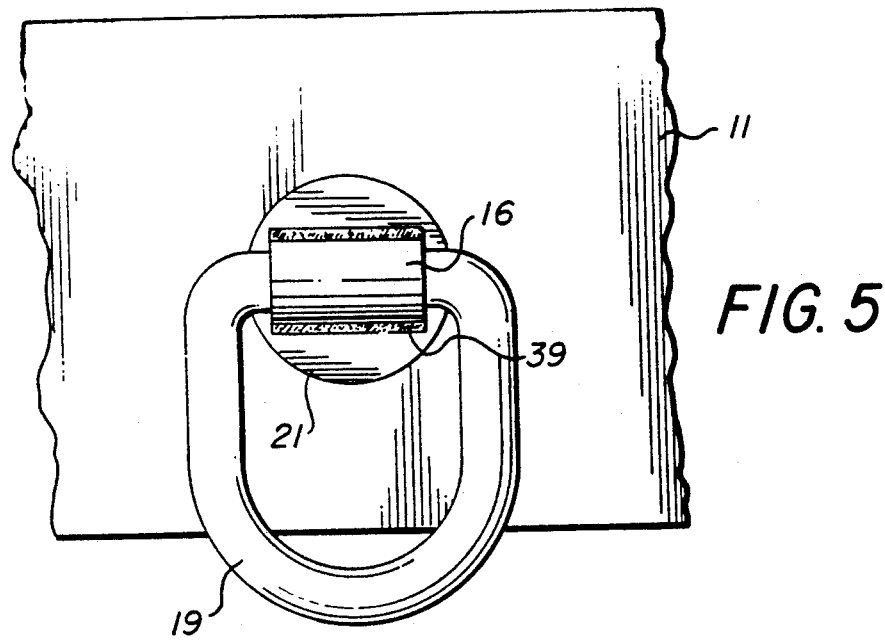
FIG. 5 is a front elevational view similar to that of FIG. 2 but showing a modification of the tiedown anchor.

The welded strength of the tiedown anchor 10 according to the present invention can be still further increased by providing additional welding 39 between the legs and the outer or front face 21 of the raised center portion of the back plate. These additional welds 39 together with the welds attaching the legs of the clip to the rear surface of the back leg provide significantly greater welded strength than can be achieved with the prior art structure. This modification is shown in FIG. 5.

The tiedown anchor according to the present invention may also be provided with a high molecular plastic disk or washer 40 which is interposed between the rear surface of the structural member 11 and the front face of the back plate 13. This washer 40 would be annular in shape and positioned around the raised portion 14. This plastic disk would not only function as a bearing surface to provider freer rotation of the tiedown anchor with respect to the structural member but would also function as an anti-rattling shim which would reduce some of the noise caused by movement of the tiedown anchor within the opening 12 of the structural member.

Figure 4:
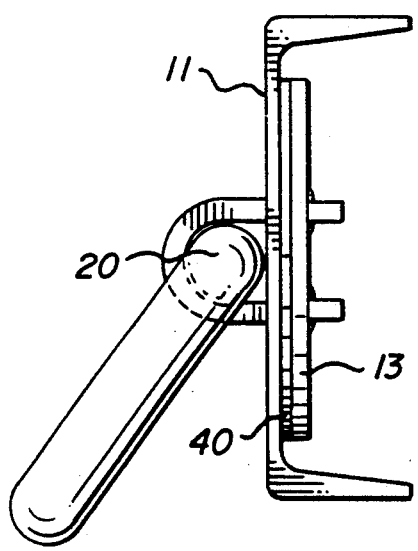
FIG. 4 is an end elevational view of the tiedown anchor shown in FIGS. 2 and 3.

It should be noted that the tiedown ring 19 as shown in FIG. 1 has a straight portion 20 which is greater in length than the diameter of the opening 12 as may be seen in FIG. 2 so as to prevent the rotatable back plate 13 from slipping out of the opening 12. As can be seen in FIG. 4, there is only a very small clearance between the straight edge 20 of the tie down ring and the front face of the structural member 11 so that any axial movement of the tiedown member within the opening is limited to this gap or clearance, but this clearance is such that the raised center portion will be unable to slip out of the opening 12.

If desired, the rotatable tiedown anchor as seen in FIG. 2, can be permanently mounted in the position illustrated by welding the back plate 13 to the structural member 11. The result will be a tiedown anchor which is not rotatable but which has significantly greater strength because the legs of the clip pass through the back plate and are welded in position on the rear surface of the back plate.

Thus it can be seen that the present invention has provided a significantly improved and strengthened cargo tiedown anchor wherein the U-shaped clip containing the tiedown ring is fastened to the structural member on the rear of the structural member rather than on the front of the structural member as evidenced by the prior art. Further, the tiedown anchor can be either rotatable so as to be adjustable to any angular position or it may be permanently fixed in position. By providing a rotatable tiedown anchor, the tiedown ring will be quickly aligned with the forces exerted by the cargo line being attached to the tiedown ring.

It will be understood that this invention is susceptible to modification in order to adapt it to different usages and conditions, and accordingly, it is desired to comprehend such modifications within this invention as may fall within the scope of the appended claims.

What is claimed is:

1. A cargo tiedown anchor for mounting on a vehicle or wall comprising a back plate having front and rear surfaces and a raised central circular portion on said front surface positionable rotatably in an opening in a wall, there being a pair of parallel slots in said raised portion, a U-shaped clip comprising a pair of legs having ends and a tiedown ring between said legs of said clip, said legs inserted in said slots in said raised portion, means on said clip for positioning said clip on said raised portion such that the ends of said clip legs protrude beyond said rear surface of said back plate, and means for bonding said protruding ends of said legs to said rear surface of said back plate.

2. A cargo tiedown anchor as claimed in claim 1 wherein said tiedown ring is larger than the diameter of said wall opening so as to prevent said back plate raised portion from slipping out of said opening.

3. A cargo tiedown anchor as claimed in claim 1 wherein said means for bonding comprises welds.

4. A cargo tiedown anchor as claimed in claim 3 wherein said welds are around the periphery of each leg end adjacent the rear surface of said back plate.

5. A cargo tiedown anchor as claimed in claim 1 and further comprising welds between said clip legs and a front surface of said raised portion.

6. A cargo tiedown anchor as claimed in claim 1 wherein a front surface of said raised portion is substantially flush with said wall.

7. A cargo tiedown anchor as claimed in claim 1 wherein said raised portion of said back plate has a thickness substantially equal to the thickness of the wall with the opening therein.

8. A cargo tiedown anchor as claimed in claim 1 wherein said tiedown ring has a straight portion which is received in said clip.

9. A cargo tiedown anchor as claimed in claim 1 and further comprising welds between said back plate and said wall to fix said tiedown anchor in a predetermined position.

10. A cargo tiedown anchor as claimed in claim 8 wherein said straight portion of said tiedown ring has a length greater than the diameter of the opening in the wall so as to retain said raised portion in said opening.

11. A cargo tiedown anchor as claimed in claim 1 wherein said clip legs have notches therein to abut on a front surface of said central raised portion such that the ends of said clip legs protrude a predeterminated distance beyond the rear surface of said back plate.

12. A cargo tiedown anchor as claimed in claim 1 and further comprising a non-metallic washer between said back plate and the rear surface of said wall.

13. A cargo tiedown anchor for mounting on a vehicle or wall comprising a back plate having front and rear surfaces and a raised central circular portion on said front surface and rotatably positionable in an opening in a wall, there being a pair of slots in said raised portion, a U-shaped clip comprising a pair of legs having ends and a tiedown ring within said clip between said legs, said legs inserted in said slots in said raised portion such that said leg ends protrude beyond said rear surface of said back plate, and means on said back plate for attaching said clip to said back plate behind said wall with the opening.

14. A cargo tiedown anchor as claimed in claim 13 wherein said clip is bonded to said back plate.

15. A cargo tiedown anchor as claimed in claim 14 and comprising welding around the outlines of said protruding leg ends to attach said clip to said back plate.

* * * * *